United States Patent
Natarajan et al.

[11] Patent Number: 6,072,774
[45] Date of Patent: Jun. 6, 2000

[54] COMMUNICATION NETWORK AND METHOD FOR MANAGING INTERNODAL LINK TOPOLOGY

[75] Inventors: Kadathur S. Natarajan, Willmette, Ill.; Randy Lee Turcotte, Tempe; Sergio Aguirre, Phoenix, both of Ariz.

[73] Assignee: Motorola, Schaumburg, Ill.

[21] Appl. No.: 08/841,877

[22] Filed: May 5, 1997

[51] Int. Cl.[7] .............. H04B 7/185; H04Q 7/20; H04L 1/00; H04J 3/14
[52] U.S. Cl. .............. 370/231; 370/238; 455/12.1; 455/427; 455/450; 455/453
[58] Field of Search .............. 370/230, 231, 370/232, 238, 254, 255, 351, 319, 322, 323, 376; 455/12.1, 13.1, 427, 450, 452, 453

[56] References Cited

U.S. PATENT DOCUMENTS

| | | | |
|---|---|---|---|
| 4,912,656 | 3/1990 | Cain et al. ............... | 709/242 |
| 5,233,604 | 8/1993 | Ahmadi et al. ............ | 370/238 |
| 5,363,427 | 11/1994 | Ekstrom et al. .......... | 455/426 |
| 5,381,404 | 1/1995 | Sugano et al. ............ | 370/238 |
| 5,404,451 | 4/1995 | Nemirovsky et al. ...... | 370/238 |
| 5,612,703 | 3/1997 | Mallinckrodt ............. | 370/335 |

Primary Examiner—Michael Horabik
Assistant Examiner—Kevin C. Harper
Attorney, Agent, or Firm—Harold C. McGurk; Timothy J. Lorenz

[57] ABSTRACT

A communication network (20) includes a multiplicity of switching nodes (18), many of which are located in orbiting satellites (16). Communication links (30) interconnect the switching nodes (18). A control center (32) performs a request for connection process (40) which routes a new call request over a current internodal topology of links (35) if possible. If the new call request cannot be routed over the current internodal topology of links (35), the process (40) determines how to augment the network with the creation of new links (45) so that the new call can be routed. As calls terminate, unused links are taken out of service.

10 Claims, 5 Drawing Sheets

| LINK | STATUS IS/OS/GO | MAX. BW | RESIDUAL BW | NON-INTERFERENCE CONSTRAINTS | OTHER CONSTRAINTS |
|---|---|---|---|---|---|
| 1-2 | IS | 500 | 100 | — | — |
| 1-4 | IS | 250 | 200 | — | — |
| 2-3 | IS | 250 | 100 | — | — |
| 2-4 | OS | 150 | 150 | — | — |
| 2-5 | IS | 200 | 125 | — | — |
| 3-5 | OS | 250 | 250 | — | — |
| 3-6 | IS | 500 | 200 | — | — |
| 4-5 | IS | 250 | 100 | — | — |
| 4-7 | IS |  | 200 | — | — |
| 5-6 | IS | 250 | 100 | — | — |
| 5-7 | OS | 200 | 200 | — | — |
| 5-8 | IS | 200 | 125 | — | — |
| 5-9 | OS | 200 | 200 | — | — |
| 6-9 | IS | 500 | 200 | — | — |
| 7-8 | IS | 250 | 100 | — | — |
| 8-9 | GO | 250 | 100 | — | — |

*FIG. 4*

COMMUNICATION NETWORK AND METHOD FOR MANAGING INTERNODAL LINK TOPOLOGY

FIELD OF THE INVENTION

The present invention relates to communication networks. More specifically, the present invention relates communication networks having a dynamic topology of communication links interconnecting network switching nodes.

BACKGROUND OF THE INVENTION

Communication networks often include a multiplicity of interconnected switching nodes. Each switching node has a number of input ports and a number of output ports. A call represents a communication session taking place between two or more end nodes over a connection formed along a path through various switching nodes. A call arriving at an input port of each switching node in the call's path is switched through the switching node to a selected output port. Typically, communications for many independent calls are multiplexed together for combined transmission between the switching nodes over communication links. Accordingly, a new call can be connected through the network so long as sufficient residual capacity exists over communication links through the network of switching nodes.

In conventional networks, the topology of communication links between switching nodes changes slowly. For example, a new communication link is brought on-line infrequently. Once brought on-line, a new link becomes available for routing calls and typically remains on-line for a significant period of time. However, an existing link may go out of service due to a failure or other unusual event. When the topology of the network is reasonably static, a conventional call routing process is typically programmed to consider available link capacities in making call admission decisions. Hence, a conventional call routing process simply attempts to admit as many new connections as possible, subject to the capacity constraints of links in the relatively static topology. However, if sufficient resources are not available at the time of a connection request, the request is blocked. A blocked request is an undesirable event because denial of communication services results in unsatisfied customers and a potential loss of revenue.

When a communication network relies upon switching nodes located in satellites orbiting the earth, the topology of communication links can be more dynamic. In other words, the presence or absence of communication links between the switching nodes can change on a moment by moment basis. Topologies may change, for example, due to movements of satellite switching nodes located in non-geosynchronous orbits.

In addition, topologies may desirably change to provide flexibility in allocating network resources to call traffic demands. The ability to flexibly allocate space-based resources leads to increasingly better utilization of the resources. Fewer resources can then be placed in the satellites to accommodate a given amount of network call traffic, leading to a great cost savings. Unfortunately, a dynamic topology of switching links greatly increases the demands on a call routing process and conventional call routing processes achieve unsuitable results.

Accordingly, a need exists for a communications network in which the communication link topology itself is configured in response to demands for communication resources and calls are efficiently routed.

BRIEF DESCRIPTION OF THE DRAWINGS

FIG. 4 shows a table maintained by the control center to associate various call routing parameters with internodal links actually and potentially available to the network;

DETAILED DESCRIPTION OF THE DRAWINGS

Figure 1:
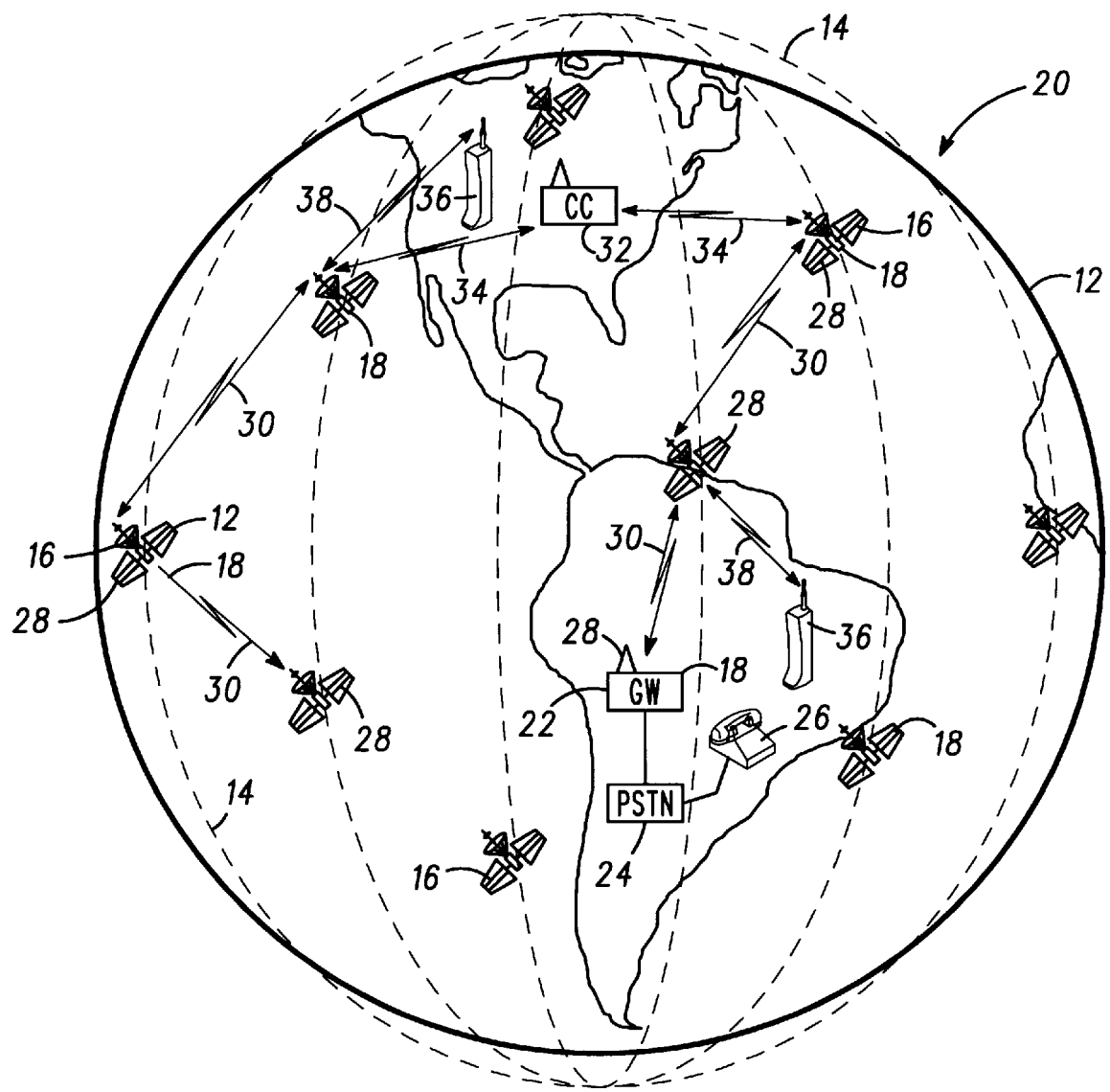
FIG. 1 shows a layout diagram of an environment in which a preferred embodiment of the present invention may be practiced.

FIG. 1 shows a layout diagram of environment 10 according to a preferred embodiment of the present invention. Environment 10 includes earth 12 having constellation 14 of satellites 16 orbiting thereabout. In particular, satellites 16 are satellites in which switching nodes 18 of communications network 20 have been located. Gateways (GW) 22, of which only one is depicted in FIG. 1, represent additional switching nodes 18 for network 20. Gateways 22 are located on or near the surface of earth 12. Accordingly, network 20 includes a multiplicity of switching nodes 18.

Switching nodes 18 at gateways 22 couple to the local public switched telecommunication network (PSTN) 24. Any number of telephonic or other communication devices 26, only one of which is depicted in FIG. 1, also couple to PSTN 24. Switching nodes 18, whether located in satellites 16 or in gateways 22, include communication equipment 28 which establishes communication links 30 with other switching nodes 18 of network 20. Communication links 30 desirably use conventional electromagnetic or optical communication media well known to those skilled in the art.

In one embodiment of the present invention, satellites 16 orbit the earth in non-geosynchronous, low-earth orbits. Thus, satellites 16 constantly move relative to gateways 22. In alternative embodiments, satellite 16 may be a satellite that orbits the earth in a medium-earth orbit, or a satellite that has a polar orbit, or a satellite orbiting the earth at an inclined angle. This constant movement forms a dynamic topology of links 30. Different gateways 22 enter and exit each satellite's field of view as satellites 16 move in their orbits. In order to limit interference, various links 30 between satellites 16 become available at certain positions in the orbits but unavailable in other positions. Moreover, limited resources on board satellites 16 can limit link 30 to being created between a given satellite 16 and a single one of a selection of neighboring satellites 16 by aiming communication equipment 28 at the single satellite 16. Only one or a limited number of a plurality of potential links may actually be realized at any given instant. Accordingly, communication links 30 between switching nodes 18 in network 20 form a dynamic internodal topology. The topology of links 30 can change from moment to moment.

Control center (CC) 32 is desirably located on or near the surface of earth 12 and is in data communication with switching nodes 18 of network 20 through one or more communication links 34. In one embodiment, any number of subscriber units 36, which are also located on or near the surface of earth 12, directly communicate through communication links 38 with switching nodes 18 located in satellites 16.

Network 20 concurrently conducts communications between end nodes of a large number of calls over the dynamic topology of links 30. The end nodes are typically located anywhere on or near the surface of earth 12. For a typical call, any communication device 26 or subscriber unit 36 may operate as either a source or destination end node. A source node represents the end node which originates the call, i.e. a calling party. A destination node represents the end node to which the call has been directed, i.e. a called party.

Network 20 originates a call by the performance of a call setup process, at least a portion of which is performed at control center 32. When a connection has been established through network 20, the call can commence and normally continues until terminated. The connection is established between end nodes 26 or 36 along a path through any number of switching nodes 18. The path may traverse any number of communication links 30. In accordance with a preferred embodiment of the present invention, a portion of the call setup process performed at control center 32 identifies this path and assigns the call to the links 30 traversed. Links 30 are created and removed from service in response, at least in part, to call traffic demand.

Figure 2:
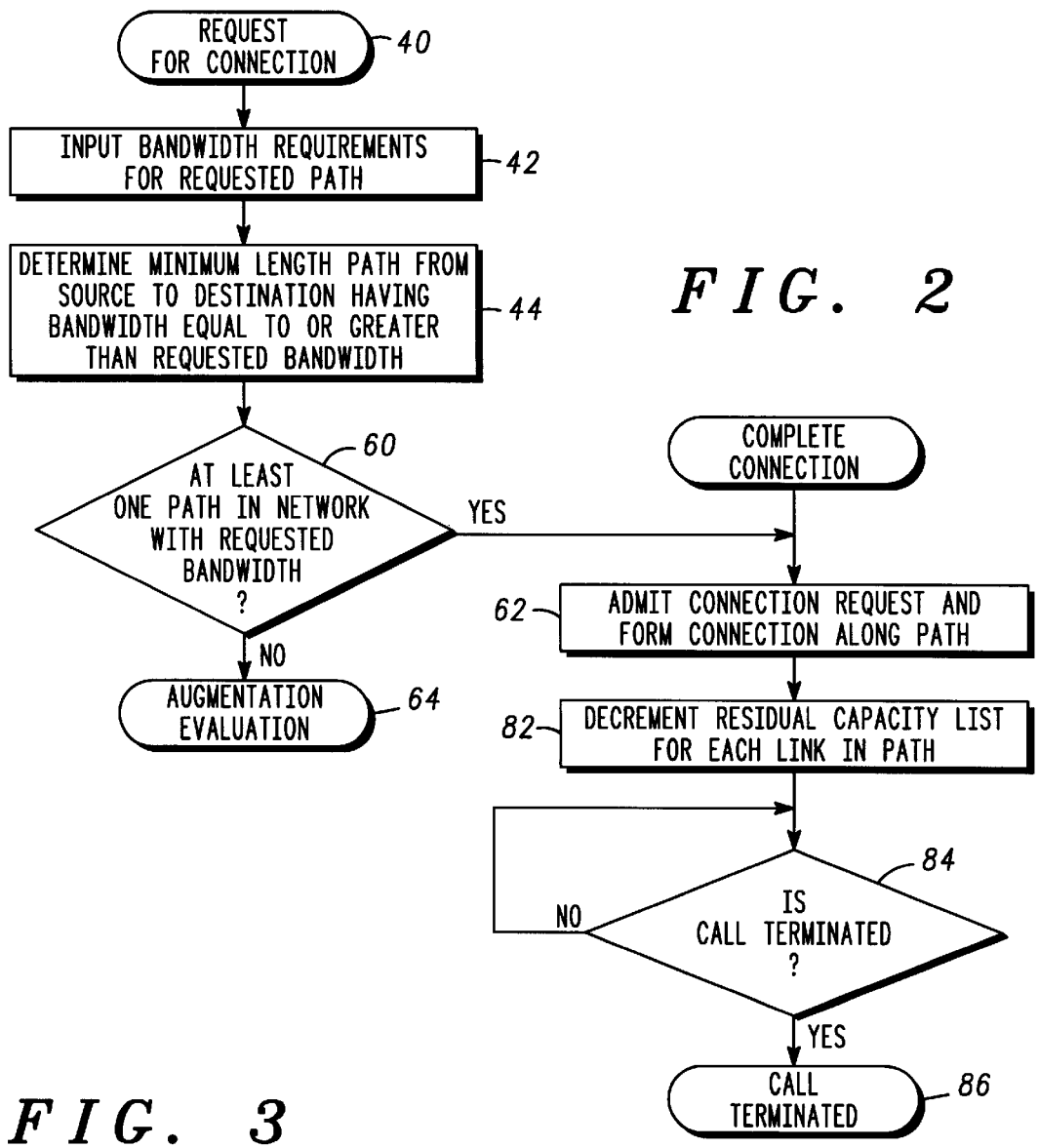
FIG. 2 shows a flowchart of a request for connection process performed at a control center of a communication network which has dynamic internodal communication links.

FIG. 2 shows a flowchart of a request for connection process 40 performed at control center 32 of communication network 20 (FIG. 1). Process 40 is performed using conventional computer equipment (not shown), such as one or more microprocessors, memory devices, and related peripheral components interfaced to communication equipment that supports communication links 34 (FIG. 1). Process 40 is also implemented through computer software executed by the computer equipment in a conventional manner.

The computer equipment at control center 32 may perform any number of processes in addition to process 40. Process 40 is initiated when a request for a connection through network 20 is received at control center 32. The request for connection represents a request by an end node to establish a communication path through various switching nodes 18 of network 20 to another end node of the call. The request may have been initiated by any communication device 26 or subscriber unit 36 (FIG. 1). Accordingly, process 40 can be performed as part of a call setup process, and the connection request can be initially received at any switching node 18 (FIG. 1) of network 20 then routed to control center 32.

Process 40 is invoked to manage a single call. Any number of instances of process 40 can operate concurrently to manage any number of ongoing calls in network 20.

In accordance with one embodiment of the present invention, a request for connection is a message or packet that conveys data describing a bandwidth amount to be supported by the requested connection. Process 40 and network 20 respond to such bandwidth request to establish a path through network 20 that accommodates a voice compatible bandwidth, video compatible bandwidth, or other bandwidth which may be requested. Accordingly, in step 42 process 40 inputs the bandwidth requirement.

Next, step 44 uses a current internodal link topology to determine a minimum length path from the source end node to the destination end node. This minimum length path should have an available bandwidth equal to or greater than the required bandwidth. The available bandwidth in a path is equal to the capacity of the link with the smallest available bandwidth along the path.

Figure 3:
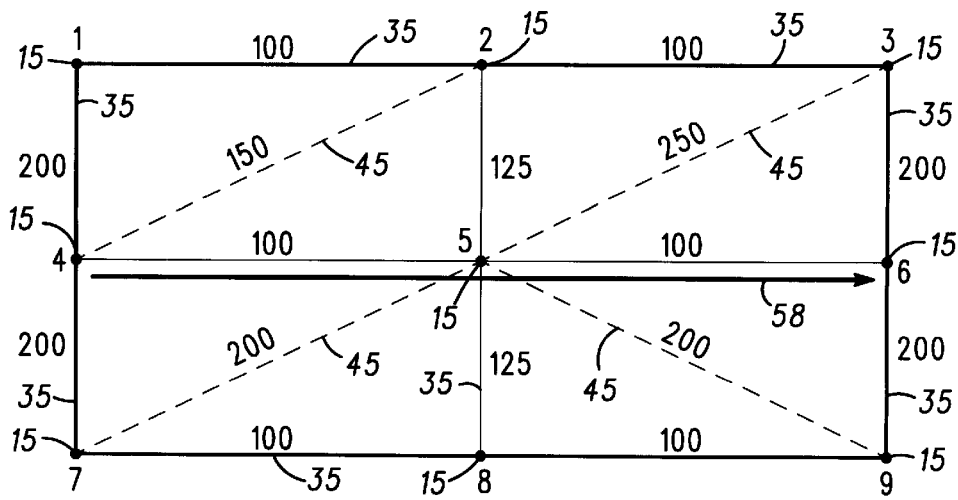
FIG. 3 shows a schematic diagram depicting a first call routing scenario for a hypothetical network.

FIG. 3 shows a schematic diagram depicting a first call routing scenario for hypothetical network 25. By way of example, FIG. 3 illustrates the current internodal link topology, the minimum length path and bandwidth constraints. FIG. 3 depicts network 25 as having nine switching nodes 15 arranged in three columns and three rows. The nine switching nodes 15 are distinguished from one another by a numeric identifier in the range of one to nine. FIG. 3 shows solid lines interconnecting various ones of switching nodes 15 to indicate currently established communication links 35. The topology of currently established communication links 35 represents the current internodal topology for network 25. Dotted lines in FIG. 3 indicate potential or candidate links 45 which have not been created within network 25 but which might possibly be created to augment the current internodal topology.

Numbers printed along side links 35 and 45 in FIG. 3 indicate residual bandwidths for the respective links. The bandwidths may be expressed in any convenient unit and are presented in FIG. 3 only for comparison with one another. Residual bandwidth refers to unused or available capacity and applies primarily to links 35 which are in service. Currently established links 35 can have additional capacity or bandwidth in addition to the indicated residual bandwidth, but that additional capacity or bandwidth are consumed by conveying communications for existing calls. Residual capacities for candidate links 45 represent the maximum bandwidth or capacity for the candidate links 45.

FIG. 4 shows table 46 maintained by control center 32 to associate various call routing parameters with internodal links 30 actually and potentially available to network 25. Table 46 includes the information graphically conveyed by FIG. 3. In table 46 each of links 30 is associated with status information 48, maximum bandwidth (MAX BW) information 50, residual bandwidth information 52, non-interference constraints 54, and other constraints 56. FIG. 4 depicts status information 48 as conveying an in-service (IS) status, an out-of-service (OS) status, or a going out-of-service (GO) status. "IS" status corresponds to created links 35 and "OS" status corresponds to candidate links 45. "GO" status can be applied to links 30 which are in service but scheduled to go out of service in the near future and should be given low priority in being assigned to calls. Those skilled in the art can devise other status indicators as well. In addition, table 46 may include other data elements associated with links 30.

Referring to the example scenario depicted in FIGS. 3–4, if a request for a connection from node 4 to node 6 indicates a bandwidth requirement of 100, then a minimum length path 58 through the current topology of links 35 that can supply the requested bandwidth traverses links 4-5 and 5-6. While other paths can be routed through network 25 between nodes 4 and 6, they traverse a greater number of links 35 and are not minimum length paths.

Referring back to FIG. 2, it is minimum length path 58 that step 44 attempts to determine, if possible. Step 44 can use conventional routing algorithms known to those skilled in the art in determining minimum length path 58 within a given network. Step 44 evaluates table 46 in its determination. Status information 48 indicates which links 30 are in the current topology (i.e. links 35) and residual bandwidth information 52 indicates the associated residual bandwidth of those links 35.

After step 44, query step 60 determines whether at least one minimum length path was found to provide the requested bandwidth. In the first call routing scenario depicted in FIG. 3, at least one path is found. Thus, the current internodal link topology can accommodate the requested connection, and program flow proceeds to step 62 to complete the connection through network 25. Step 62 and subsequent connection completion steps are discussed below.

Referring to FIGS. 2 and 3, if the connection request indicated a bandwidth requirement of 150 between nodes 4 and 6, rather than the bandwidth of 100 discussed above, then the current topology of links 35 could not accommodate a connection between switching nodes 4 and 6 at the requested bandwidth. Step 44 would fail to determine a path between the source and destination end nodes, and step 60 would route program flow to an augmentation evaluation routine 64.

Figure 5:
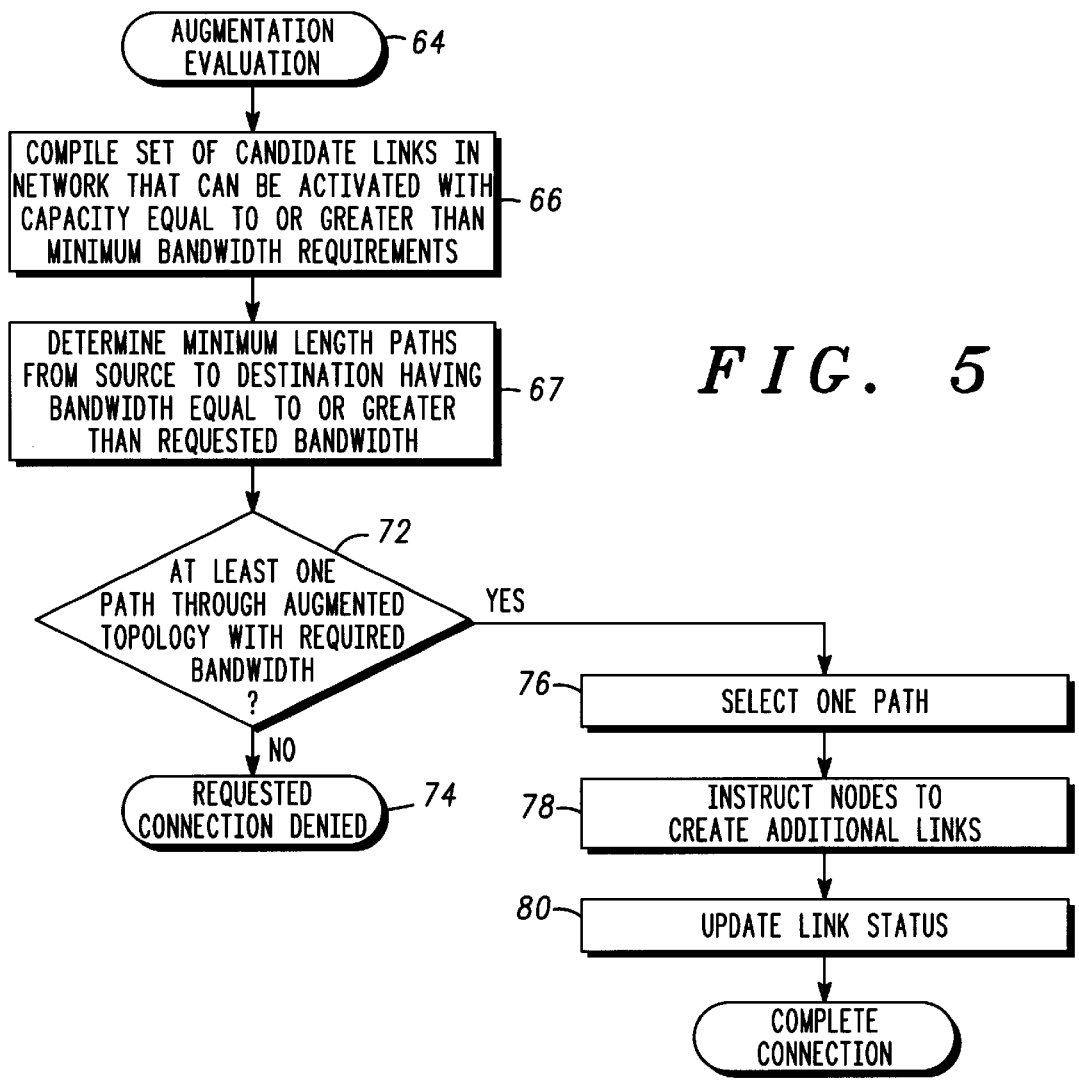
FIG. 5 shows a flowchart of an augmentation evaluation routine performed as a part of the request for connection process.
Figure 6:
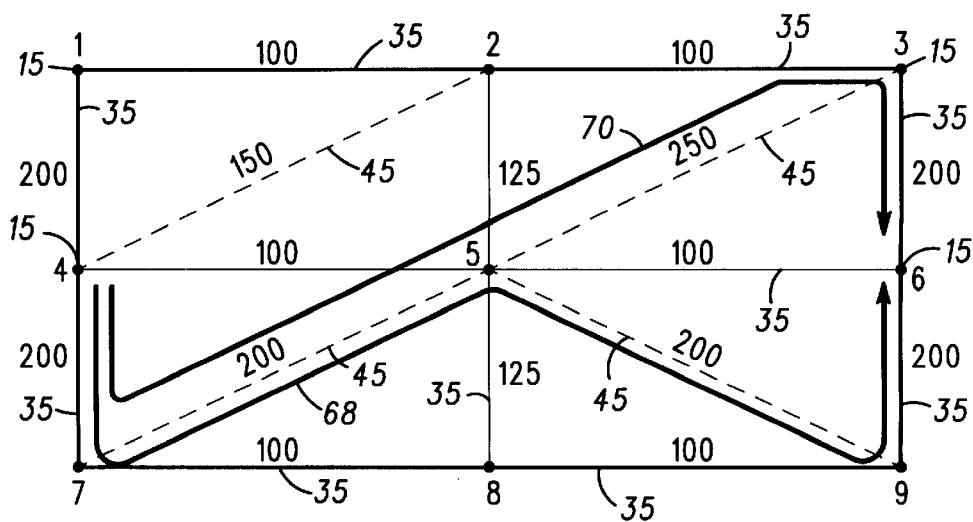
FIG. 6 shows a schematic diagram depicting a second call routing scenario for the hypothetical network.

FIG. 5 shows a flowchart of augmentation evaluation routine 64. Routine 64 is performed by control center 32 when the current topology of internodal links 35 (FIG. 3) is unable to support a requested connection. FIG. 6 shows a schematic diagram depicting a second call routing scenario for hypothetical network 25. In this second call routing scenario, network 25 has the same status as depicted in FIG. 3, but the requested bandwidth is 150 rather than 100.

Referring to FIGS. 4–6, routine 64 performs step 66 to compile a set of candidate links 45 for augmenting the current internodal topology of links 35. Step 66 can evaluate table 46 in compiling the set of candidate links 45. Candidate links have "OS" status information 48 and maximum bandwidth information 50 greater than or equal to the requested bandwidth.

In addition, step 66 desirably evaluates non-interference constraint information 54 and other constraint information 56 in compiling the set of candidate links 45. Constraint information 54 and 56 indicates whether certain candidate links 45 can actually be activated. For example, certain candidate links 45 may not be activated at particular points in an orbit because activation would cause interference with other previously created links 35. However, if those other links are themselves only candidate links 45 or if orbital geometry permits, then activation is possible. Likewise, certain candidate links 45 may be activated if other specified links are not active because the links share common resources.

Desirably, step 66 identifies at least one additional internodal link 45 that can be added to the current internodal topology of links 35. After step 66, step 67 determines one or more minimum length paths through the current internodal topology of links 35 after being augmented by the candidate links 45 identified in step 66. Step 67 is analogous to step 44 (FIG. 2), but operates upon a simulated network topology in which the current internodal topology of links 35 is augmented by candidate links 45.

FIG. 6 illustrates a first minimum length path 68 as extending between nodes 4 and 6 using links 4-7, 5-7, 5-9, and 6-9. Links 4-7 and 6-9 exist in the current topology of links 35, but links 5-7 and 5-9 are merely candidate links 45 which must first be created before they may be used. FIG. 6 also illustrates a second minimum length path 70 as extending between nodes 4 and 6 using links 4-7, 5-7, 3-5, and 3-6. Links 4-7 and 3-6 exist in the current topology of links 35, but links 5-7 and 3-5 are merely candidate links 45 which must first be created before they may be used. Since both of paths 68 and 70 include the same number of links 30 and no other paths using fewer links 30 can be found, both of paths 68 and 70 are considered minimum length paths.

After step 67, query step 72 determines whether step 67 found at least one path through the simulated augmented network topology. If no path could be found through the simulated augmented network topology, then program flow proceeds to a requested connection denied process 74. Process 74 takes steps to inform the source end node that the call is being blocked. Such steps can include the initiation of a message to be transmitted toward the source end node. The message can cause a busy tone or other busy signal to be enunciated at the source end node.

When query step 72 determines that at least one path can be found through the current topology of links 35 augmented by one or more candidate links 45, program flow proceeds to step 76. Step 76 selects only one of the minimal length paths determined above in step 67, assuming that multiple minimal length paths were found. The precise selecting algorithm used in step 76 is not critical, but the selected path desirably includes the fewest number of candidate links 45. In the example illustrated in FIG. 6, minimum length paths 68 and 70 have the same number of candidate links 45 (i.e. two each). In this case, a selecting algorithm may desirably choose the path which leaves the greatest residual capacity within network 25 or apply other criteria.

Next, step 78 instructs switching nodes 15 to create the additional links needed to implement the selected path. After step 78, step 80 updates status information 48 in table 46 to indicate that certain previously out-of-service (OS) links 45 are now in service (IS) links 35. In addition, step 80 insures that the residual bandwidth information 52 for these newly created links indicates the maximum bandwidth available. After step 80, program flow proceeds to step 62 (FIG. 2) to complete the requested connection.

Figure 7:
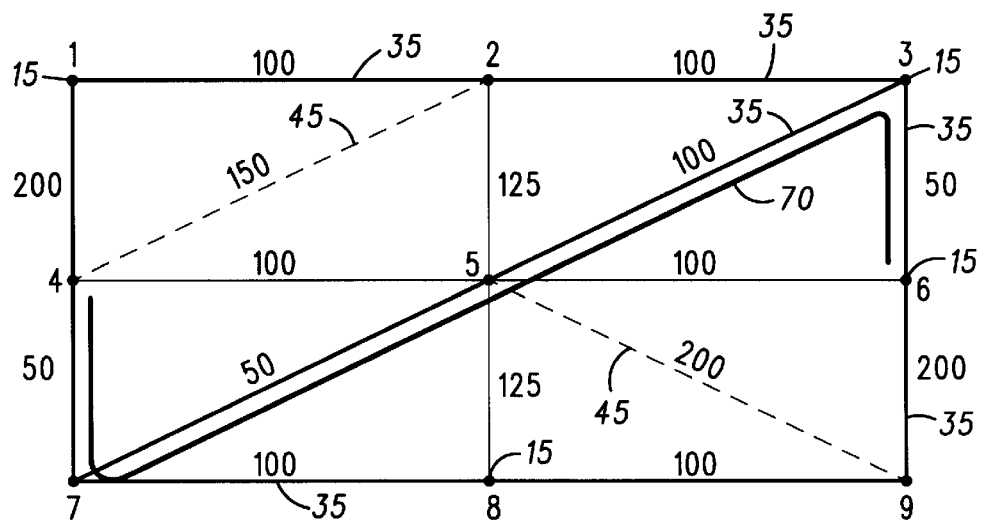
FIG. 7 shows a schematic diagram depicting a third call routing scenario for the hypothetical network.

FIG. 7 shows a schematic diagram depicting a third call routing scenario for hypothetical network 25. In this third call routing scenario, network 25 has a status which results from admitting a connection with a requested bandwidth of 150 into a network having the status depicted in FIGS. 3 and 6. The FIG. 7 scenario assumes that path 70 was selected over path 68 (FIG. 6) at step 76 (FIG. 5).

Referring to FIGS. 2, 3 and 7, step 62 is performed whenever a connection can be formed through the current topology of links 35. As discussed above, that current topology may have existed when process 40 was originally initiated (FIG. 3), or the current topology existing when process 40 was originally initiated may have been augmented by creating at least one new link 35 from at least one candidate link 45 to form a new current topology (FIG. 5). Step 62 issues instructions from control center 32 which cause network 25 to establish or otherwise form the requested connection. The requested connection can be formed along a path determined above in either step 44 or step 67 (FIG. 5).

Following step 62, step 82 maintains the residual bandwidth list information 52 (FIG. 4) for the links 35 traversed by the connection path. In particular, step 82 decrements the indicated residual bandwidth for each of the traversed links 35 by the bandwidth requested for the connection. FIG. 7 depicts residual bandwidths for links 4-7, 5-7, 3-5, and 3-6 which have been decremented by the requested bandwidth of 150 from their original values indicated in FIG. 6.

At the conclusion of step 82, a connection can or may be formed and continue indefinitely. While the connection exists, other processes 40 may begin for other connection requests and/or other processes 40 may terminate for other calls which were ongoing when process 40 began. When other processes 40 begin while process 40 is ongoing for a given call, those processes will attempt to route connections through the current internodal topology of links 35 existing.

This current internodal topology includes any links 30 which may have been newly created through the performance of step 78 (FIG. 5) in the current process 40. Accordingly, once a link 35 has been created, it's residual bandwidth becomes available for other calls to use.

Following step 82, a query step 84 determines whether the call being managed by process 40 has terminated. Termination of a call can be recognized when control center 32 receives a message from network 20 that informs control center 32 of the call termination. So long as no such message has been received, program flow remains at step 84. When step 84 detects call termination, program flow proceeds to call termination routine 86.

Figure 8:
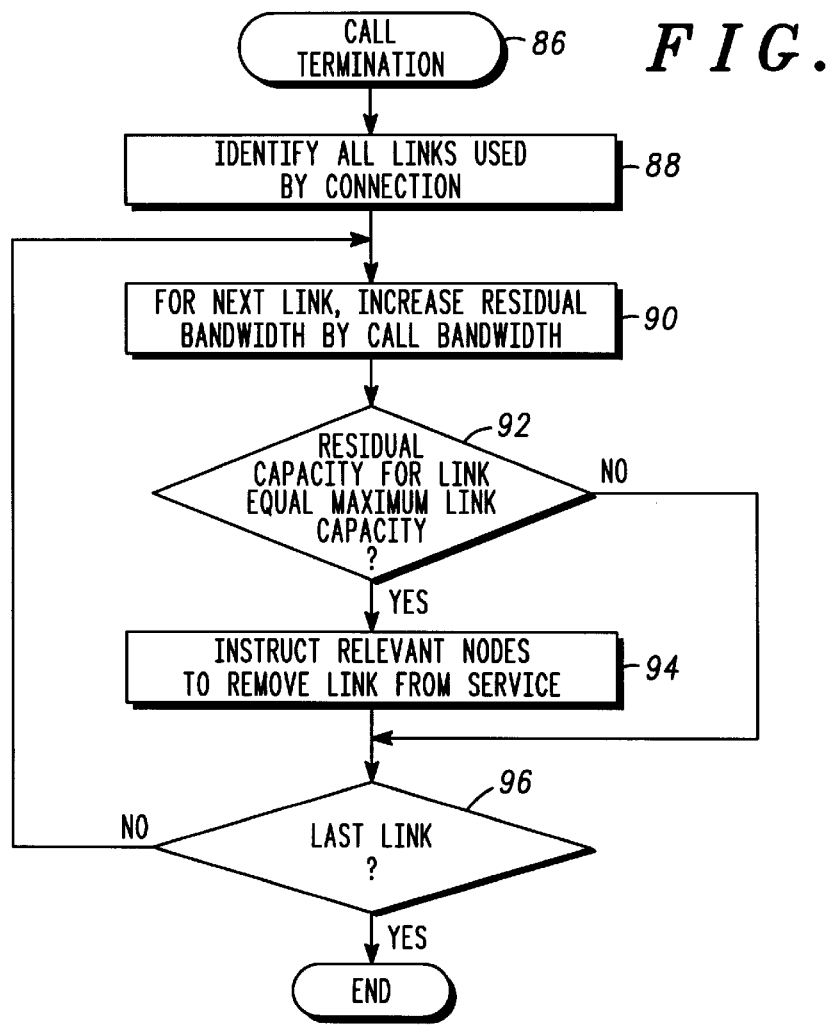
FIG. 8 shows a flowchart of a call termination routine performed as a art of the request for connection process.

FIG. 8 shows a flowchart of call termination routine 86. Routine 86 performs step 88 to identify all links 35 used by the connection process 40 is monitoring. These links 35 may be the same links for which step 82 (FIG. 2) was performed above, or they may have changed over the course of the call. If links 35 used by a call changed over the course of the call, then residual bandwidth information 52 (FIG. 4) also changed to track the link changes.

Next, step 90 maintains residual bandwidth list 52 (FIG. 4) for a first one of links 35 identified above in step 88. Step 90 is performed in a programming loop where each iteration of the loop processes another link 35 in the terminating connection. Subsequent iterations of step 90 process other links 35 identified above in step 88.

Step 90 maintains list 52 by incrementing residual bandwidth information 52 by the requested bandwidth for the call. Nothing requires the bandwidth to remain static over the duration of a call. Accordingly, if bandwidth requirements change over the duration of a call, then such bandwidths changes are desirably tracked and reflected in residual bandwidth list 52.

Next, query step 92 determines whether the residual bandwidth for the link 35 being considered equals the link's maximum bandwidth. The maximum bandwidth may be determined from list 50 in table 46 (FIG. 4). If the residual and maximum bandwidths are equal, then no calls are currently using the link. In this situation, step 94 may instruct the relevant switching nodes 15 to remove link 35 from service and make the appropriate status changes in status list 48 (FIG. 4).

The removal of link 35 from service converts link 35 into candidate link 45. As candidate link 45, link 30 may be recreated when demand requires. However, call traffic demands may cause other candidate links 45 to be created first, and conversion of such other candidate links 45 into created links 35 may impose constraints which prohibit the creation of this candidate link 45. Accordingly, on a network wide basis, links 30 are dynamically created and network resources are dynamically adapted to call demand.

Following step 94 and when step 92 determines that the residual bandwidth for link 35 does not equal the link's maximum bandwidth, query step 96 determines whether the last link identified above in step 88 has been processed. So long as last link 35 has not yet been processed, program flow loops back to step 90 to process next link 35. When last link 35 has been processed, program flow exits routine 86 and process 40 (FIG. 2). Additional processes may continue for other calls and begin as new connection requests are received at control center 32.

In summary, the present invention provides an improved communication network and method for managing an internodal link topology. Links need not be created and dedicated for a specific internodal purpose. Rather, links are dynamically created and taken out of service in response to call demands. This gives a communication network improved flexibility in allocating its scarce resources to demands placed on those resources. Moreover, a connection request process efficiently routes calls using a dynamic internodal topology. Calls are routed using existing links as much as possible. However, new links are created as demand dictates and existing links are taken out of service when demand no longer requires them.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of providing a communication path between a source end node and a destination end node using a dynamic topology of orbital communication links formed between a plurality of orbiting switching nodes, the method comprising the steps of:
   a) receiving a request for the communication path, said request containing a bandwidth to be supported by the communication path;
   b) establishing the communication path using a current internodal link topology formed with the orbital communication links existing between the plurality of orbiting switching nodes if said current internodal link topology is able to support said bandwidth;
   c) augmenting said current internodal link topology to form an augmented internodal link topology by creating at least one additional orbital communication link between at least two additional orbiting switching nodes of said plurality of switching nodes; and
   d) establishing the communication path using said augmented internodal link topology if said current internodal link topology is unable to support said bandwidth.

2. A method as recited in claim 1, further comprising the step of maintaining a list of residual bandwidths for the orbital communication links existing between the plurality of orbital switching nodes.

3. A method as recited in claim 2,
   further comprising the step of decreasing the residual bandwidths in the list of residual bandwidths for each of the orbital communication links used in establishing the communication path.

4. A method as recited in claim 2, further comprising the steps of:
   terminating the communication path; and
   increasing the residual bandwidths in the list of residual bandwidths for each of the orbital communication links used by the communication path terminated in the step of terminating the communication path.

5. A method as recited in claim 4, wherein step c) comprises the step of identifying candidate orbital links having bandwidths above a minimum threshold.

6. A method as recited in claim 5, wherein the step of identifying candidate orbital links comprises the step of evaluating link constraints for non-interference with the current internodal link topology.

7. A method as recited in claim 1, further comprising the steps of:
   receiving a second request for a second communication path, said second request containing a second bandwidth to be supported by the second communication path; and
   establishing the second communication path using said augmented internodal link topology when a residual bandwidth for the at least one additional internodal orbital communication link accommodates the second bandwidth.

8. A method as recited in claim 1, wherein the step c) comprises the steps of:

identifying candidates for the at least one additional orbital communication link; and determining minimum length paths between the source end node and the destination end node through the current internodal link topology and the candidates for the at least one additional orbital communication link.

9. A method as recited in claim 8, further comprising the step of selecting a minimum path from the minimum length paths having the least number of orbital communication links.

10. A method as recited in claim 1, further comprising the step of removing an unused orbital communication link from said current internodal link topology if said unused orbital communication link is not used in at least one communication path in said current internodal link topology.

\* \* \* \* \*